Sept. 17, 1968 AN WANG 3,402,285

CALCULATING APPARATUS

Filed Sept. 22, 1964

United States Patent Office 3,402,285
Patented Sept. 17, 1968

3,402,285
CALCULATING APPARATUS

An Wang, Lincoln, Mass., assignor to Wang Laboratories, Tewksbury, Mass., a corporation of Massachusetts Filed Sept. 22, 1964, Ser. No. 398,254
24 Claims. (Cl. 235—160)

ABSTRACT OF THE DISCLOSURE

A calculator includes an input register and a log register, each having adder circuitry coupled to it. Ten manual control buttons are provided for entering numerical values 0 through 9 into the input register. The calculator also includes a store of logarithmic values of the following constants: 10, 2, 0.9, 1.01, 0.999 and 1.0001 and a sequencer. Operation of the sequencer is initiated by a single manual log control button. The sequencer then automatically controls, in a series of steps, the selection of constants and the operation of the input register and log register adders to generate in the log register a logarithmic value of the quantity stored in the input register.

Figures 1, 2:
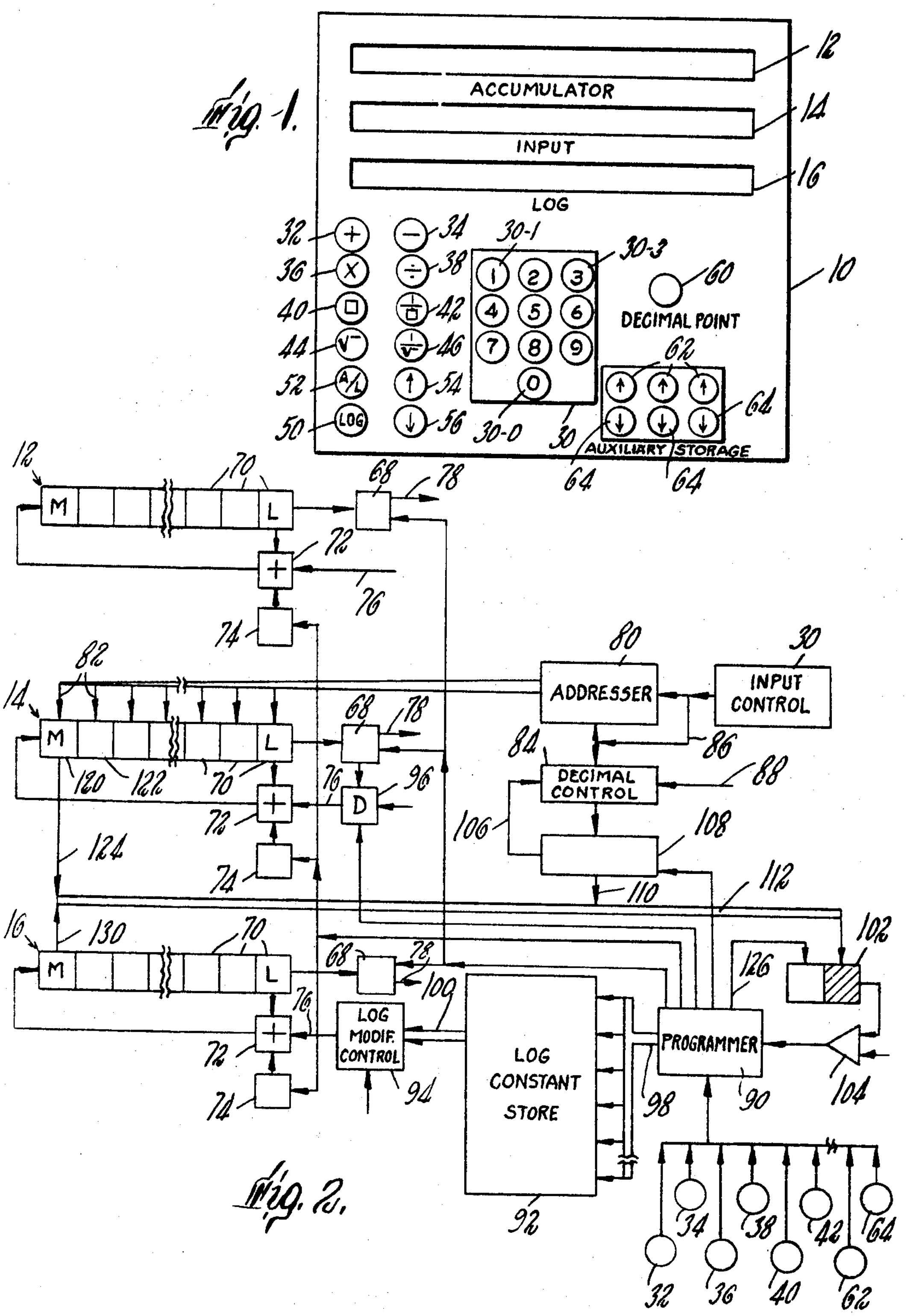

This invention relates to calculating apparatus and more particularly to calculating apparatus that include the capability of manipulating data on a logarithmic basis.

Current commercial and scientific procedures demand that increasingly large masses of data be processed, and such processing frequently involves or is an integral part of mathematical analyses. Such mathematical analyses encompass, in addition to addition and subtraction, multiplication, division and even more complex manipulations, e.g. those employing exponential values. While digital computers of conventional logic organization can perform such manipulations, the techniques that are employed frequently involve complex, circuitous and time-consuming operations to obtain the desired results or solutions to specific problems.

The logarithm is a well known tool for simplifying such operations. However, the techniques for utilizing logarithms in calculations have, in general, employed either mechanical devices (analog computers) in the nature of slide rules or similar but more sophisticated devices, or stored tables of logarithmic values (e.g. a preset relay matrix) in a digital computer type of device. The analog devices, in addition to the speed and accuracy limitations inherent in such devices, have characteristics of inflexibility relative to available processing techniques, while the stored table technique requires tremendous storage capacity which result in large and expensive computer equipments.

Accordingly, it is an object of this invention to provide a novel and improved calculating apparatus which enables more expeditious performance of mathematical manipulations.

Another object of the invention is to provide a compact calculating device capable of performing complex mathematical manipulations.

Still another object of the invention is to provide a novel and improved computer capable of performing computations on a logarithmic basis.

Another object of the invention is to provide novel and improved apparatus for generating logarithms.

Still another object of the invention is to provide novel and improved apparatus for converting logarithmic numbers into their natural (base) number form.

Apparatus constructed in accordance with the invention includes means for generating logarithmic values by successively multiplying a value in natural number form by selected constants and correspondingly modifying a logarithmic value by the logarithms of the selected constants. The selected constants are preferably related to the radix of the natural number in the form $1 \pm 1/R^A$, where R is the radix and A is an integer. Use of such constants enables each multiplication operation to be performed by a shift and single addition step. Means are provided to sense the size of the natural number as it is varied in the multiplication operation, and in response to each sensing of a predetermined numerical condition, the value of the constant is changed. With the present day logic technology, the invention enables the generation of the logarithm from a base number in less than fifty milliseconds.

The generation of antilogarithms is accomplished through modified control of the same circuitry. Logarithmic values are stored in digital form available for immediate and direct manipulation or for transfer to auxiliary temporary storage, as desired, in accord with the nature of the mathematical operations being performed. Apparatus incorporating the invention enables performance of addition, subtraction, multiplication, division, exponential manipulations (involving the use of logarithms of logarithms (log log) for example) may take the form of a compact desk type of calculator.

Other objects, features and advantages of the invention will be seen as the following description of a preferred embodiment thereof progresses, in conjunction with the drawing, in which:

FIG. 1 is a diagrammatic view of the control panel of a calculator constructed in accordance with the invention; and FIG. 2 is a logic block diagram of apparatus employed in that calculator.

There is shown in FIG. 1 a diagrammatic indication of the control panel 10 of a desk type calculator. Display is provided on the face of the control panel for three registers—an accumulator register 12, an input register 14 and a log register 16. These displays may be of the electronic type, employing a cathode ray tube or Nixie tubes, for example.

Positioned on the control panel adjacent the register displays are a series of controls. A first group of controls for entering numerical values in decimal form into input register 14 is located in the center area 30, the ten control buttons being designated 30–1—30–0, as indicated. In addition there is provided a series of computation controls—addition control 32, subtraction control 34, multiplication control 36, division control 38, square control 40, reciprocal of the square control 42, square root control 44, and reciprocal of the square root control 46. A third group of controls enable the transfer of data between registers 12, 14, and 16. Depression of control button 50 will convert the quantity stored in the word register 14 into its logarithmic form and store it in register 16 (actually in the same manner as the multiplication control 36); depression of control button 52 will convert the logarithm value stored in log register 16 into its natural (base) form and store it in the accumulator register 12. Button 54 controls the transfer of the contents of log register 16 to word register 14 directly (that is, without any logarithmic conversion), and button 56 controls the transfer of the contents of accumulator register 12 to the log register 16 without a logarithmic conversion.

In addition, there is provided a decimal point control 60 which is used to indicate the position of a decimal point in the data being entered into the word register and a series of controls enabling transfer between the log register 16 and auxiliary storage registers, buttons 62 controlling transfer to auxiliary registers from the log register and buttons 64 controlling transfer from the corresponding auxiliary registers to the log register.

The calculator as shown in logical block form in

FIG. 2 includes the three shift registers 12, 14, and 16, each of which has a corresponding number of stages 70. Coupled to each shift register is a decimal adder circuit 72 which may be of conventional design, and control 74 coupled to the decimal adder 72 which determines whether an addition or subtraction operation is to be performed by the adder circuit 72. As the calculator operates on numbers in the decimal radix, each stage 70 includes four flip-flops together with controls for storing signals in an appropriate binary coded decimal form. In an addition (or subtraction, depending on the condition of control 74) operation of the accumulator register 70, an input train of BCD signals on line 76 is serially added to the contents of the shift register as transferred from the least significant stage 70–L, and each resulting sum digit is placed in the most significant stage 70–M and then shifted with the other signals stored in the register. Upon completion of the shift of the word through the register, the result (sum or difference) is stored therein. Transfers from the register to other registers are over line 78 under control of gating units 68. It will be obvious that a variety of adder circuitries, both serial type and parallel type, may be employed in the practice of the invention, and the transfer control may likewise take a number of forms.

Data is entered into the word register 14 from keyboard converter control 30 or from a separate input device, such as a tape (which input data may include programmed control instructions) through addresser 80 which channels the entry of data over lines 82 into the respective stages 70 of register 14. Addresser 80 includes a counter and gate logic which indicates the next ordinal position in register 14 that is available for data entry. The first digit (converted into appropriate binary coded form by conventional means in control 30) is thus entered in the most significant stage, the next digit in the immediately adjacent stage, etc., under the control of addresser 80. Decimal point button 60 controls the stepping of decimal point storage register 84, a counter which stores an indication of the decimal point position. That register is stepped upon entry of each digit by a signal on line 86 from control 30 until button 60 is depressed, which operation provides a signal over line 88 that terminates the stepping operation. The contents of register 84 then indicate the decimal places in the number entered into and displayed from word register 14. (The decimal point position may also be displayed if desired.) If the number to be entered in register 14 is less than one, the decimal point button 60 is depressed before any entries are made through control 30, and then the digits of the number, including all the zeros, are entered serially.

The calculator also includes a programmer 90 which is responsive to the control buttons 32, 34, 36, 38, 40, 42, 44, and 46; a logarithmic constant store 92; and a logarithm converter circuit 94. In response to the depression of a computation control button, the programmer 90 determines the nature of the operation to be performed and operates the add subtract control circuitries 74 associated with registers 14 and 16; a delay control 96 associated with register 14 and optionally the converter circuit 94 to modify the contents of both registers 14 and 16.

Memory 92 stores the logarithmic values of pre-established constants which are related to the radix of the number system to be employed in the calculator, in this case the decimal system. Those logarithms may be to any desired base, for example the base *e*, and in this calculator are as follows:

| Constant: | Log |
|---|---|
| 10 | 2.302585093 |
| 2 | .693147181 |
| .9 | .105360516 |
| 1.01 | .009950331 |
| .999 | .001000500 |
| 1.0001 | .000099995 |

It will be noted that the last four constants are in the form $1 \pm 1/R^A$ where R is 10 and A is successively the integers 1, 2, 3, and 4. With respect to logarithm generation operations, the operation of the programmer 90, a sequencer or counter, is initiated by the manual log control button 50 via OR circuit 104 and the sequencer is stepped automatically under the control of the contents of input register 14 to control the sequence of steps in the generation of a logarithm. Each logarithm read out of memory 92, as controlled by the output of the programmer 90 on line 98, is applied over a line in cable 100 through converter 94 to the adder 72 to modify the contents of register 16 in an addition or subtraction operation, also as controlled by programmer 90. Programmer 90 also causes the contents of register 14 to be modified in multiplication operations by the constants. Flip-flop 102 and OR circuit 104 control the stepping of programmer 90, and the flip-flop is actuated in response to a change in the value of the quantity stored in either register 14 or register 16. These modification operations, while coordinated, may be performed in various manners, for example, at substantially the same time or one modification operation may be completed and the other then commenced and performed as a function of the first.

After a number has been loaded into word register 14, the button for the selected operation is depressed. Assume a direct logarithmic conversion is to be made and log register 16 is clear. Button 50 is depressed and a pulse is applied through OR circuit 104 to step programmer 90 which generates control signals for the first step of the logarithmic conversion operation. That first step is to adjust the decimal place, as necessary for the operation, so that the value stored in word register 14 is between 0.1 and 1.0. This is done in a shifting operation (utilizing delay circuit 96, for example). An effective shift of one order to the left multiplies the quantity by a factor of ten and a similar shift to the right divides the quantity by ten. In this embodiment concurrent with each shift, a corresponding subtraction (or addition) of the log to the selected base of ten is made to the contents of the log register 16.

The modification operations are continued with each modification changing the contents of decimal point register 84 by ONE (line 106 from sensor 108) until register 84 goes to ZERO at which time an output is produced on line 110. That output is applied over cable 112 to set flip-flop 102 and the transition is passed through OR circuit 104 to step programmer 90. Alternatively, the modification operations may continue until most significant stage 120 of register 14 contains ZERO and the next stage 122 contains a value other than ZERO. When that condition is detected, a signal over line 124 and cable 112 will set flip-flop 102 and step the programmer 90 to Step Two. The next output signal from programmer 90 over line 126 will clear flip-flop 102 in preparation for the next programmer stepping pulse.

When the contents of register 14 have been properly adjusted, that value is then multiplied by TWO. This operation (Programmer Step Two) is accomplished by adding the contents of register 14 to itself. As soon as the most significant stage 120 of the word register 14 contains a value other than ZERO, an output is produced on line 124 which steps programmer 90 to Step Three. Concurrently with each multiplication of the contents of register 14, the logarithmic value of two is subtracted from the contents of log register 16.

The programmer in Step Three mode effects a multiplication of the contents of the word register times the constant 0.9 with corresponding addition of the logarithm of 0.9 to the contents of log register 16. This multiplication operation (×0.9) can be performed in a single adder operation involving the subtraction of one-tenth of the quantity stored in the word register from that quantity. The one-tenth value is obtained by a shift of one order as controlled by delay 96 and inserting the delayed quantity through adder 72 in a subtraction operation. When the contents of stage 120 change to ZERO, the output on line 124 steps programmer 90 to Step Four.

The modification operation is continued in similar manner, multiplying by the constants 1.01 ($1+1/10^2$); 0.999 ($1-1/10^3$) etc. until the contents of register 14 equal ONE to a preestablished accuracy. (When the constant 0.99999 (Step Seven) is reached, the difference between the content of the word register 14 and ONE may be added directly to the contents of the log register 16.) At that time the quantity stored in log register 16 is the logarithm of the value originally stored in word register 14.

An example of this operation is indicated in the following table in which the steps to generate the log to the base *e* of the number 2.10 by this apparatus are set forth.

| Programmer Step | Constant | Register 14 | Register 16 |
|---|---|---|---|
| | | 2.100000 | 0.00000 |
| 1 | × .1 | .210000 | 2.30259 |
| 2 | ×2 | .420000 | 1.60944 |
| 2 | ×2 | .840000 | .91629 |
| 2 | ×2 | 1.680000 | .22314 |
| 3 | × .9 | 1.512000 | .32850 |
| 3 | × .9 | 1.3608 | .43389 |
| 3 | × .9 | 1.22472 | .53922 |
| 3 | × .9 | 1.102248 | .64458 |
| 3 | × .9 | .992024 | .74994 |
| 4 | ×1.01 | 1.001944 | .73999 |
| 5 | × .999 | 1.000943 | .74099 |
| 5 | × .999 | .999943 | .74199 |
| 6 | ×1.0001 | 1.000042 | .74189 |
| 7 | × .99999 | 1.000032 | .74190 |
| 7 | × .99999 | 1.000022 | .74191 |
| 7 | × .99999 | 1.000012 | .74192 |
| 7 | × .99999 | 1.000002 | .74193 |

The next quantity is then loaded into word register 14 via input control 30. If multiplication is to be performed, the logarithm of this quantity is generated in the same manner as described above and thus that quantity is added to the log value already stored in the log register 16, whereas if division is to be performed, the steps of generating the logarithm of the second number are performed in complement sequence so that that quantity is effectively subtracted from the value stored in the log register 16.

If a number is to be squared, control circuit 94 is operated in response to the corresponding control button to double all the log values transferred from storage 92. Similarly, a square root may be directly taken by halving each of the log values that is transferred from memory 92 to register 16.

When it is desired to obtain the natural number from a logarithm (antilog), the transfer steps are reversed with the word register 14 being set initially to the value 1.0. The log register 16 contains the logarithm of the value to be set into word register 12. First the exponent (first digit) of the log is sensed and adjusted to a value less than ZERO, effecting a multiplication (or division) by an integral multiple of ten. An output on line 130 from the most significant stage of register 16 steps programmer 90. The location of the decimal point is stored.

The contents of the word register 14 are then multiplied by 0.9 and the corresponding log value is added to the contents of register 16 until the contents of the log register exceed ZERO. At that time the programmer 90 is stepped and cause the contents of the word register to be multiplied by the quantity 1.01 and the log of that constant to be subtracted from the contents of log register 16. This manipulation is repeated until the contents of log register are less than ZERO, at which time programmer 90 is stepped. When register 16 contains ZEROS in all the significant stages, word register 14 stores the value whose log was initially stored in register 16.

The following is a step-by-step example of the conversion of the number 4.23845 to its antilog.

| Programmer Step | Constant | Register 14 | Register 16 | Decimal Point |
|---|---|---|---|---|
| | | 1.000000 | 4.23845 | 0 |
| 1 | 0.1 | 1.000000 | 1.93586 | 1 |
| 1 | 0.1 | 1.000000 | 99.63327 | 2 |
| 2 | 0.9 | .900 | 99.73863 | 2 |
| 2 | 0.9 | .81 | 99.84399 | 2 |
| 2 | 0.9 | .729 | 99.94935 | 2 |
| 2 | 0.9 | .6561 | 00.05471 | 2 |
| 3 | 1.01 | .662661 | 00.04476 | 2 |
| 3 | 1.01 | .669287 | 00.03481 | 2 |
| 3 | 1.01 | .675970 | 00.02486 | 2 |
| 3 | 1.01 | .682738 | 00.01491 | 2 |
| 3 | 1.01 | .689565 | 00.00496 | 2 |
| 3 | 1.01 | 696460 | 99.99501 | 2 |
| 4 | 0.999 | .695764 | 99.99601 | 2 |
| 4 | 0.999 | .695069 | 99.99701 | 2 |
| 4 | 0.999 | .694374 | 99.99801 | 2 |
| 4 | 0 999 | .693680 | 99.99901 | 2 |
| 4 | 0.999 | .692987 | 00.00001 | 2 |

The antilogarithm is 69.2987.

It will be observed that the logarithm of a logarithm may be taken by transferring the contents of register 16 to register 14 and then performing a log generation transfer. The process may be reversed in similar manner to generate antilogs. Natural numbers may be added (or subtracted) in conventional manner through the use of the accumulator register 12. (A time shared adder may be used in place of the three adders if desired.) As indicated above, in addition to manual input control, programmed control from a tape for example may be employed to control the calculator in the performance of a complex series of manipualtions. Also raw data may be entered into the calculator from a tape or other record for performance of a series of calculations.

While the apparatus has been described in conjunction with the decimal radix, it will be obvious that the invention is not limited thereto and provides calculating mechanisms which may operate in any desired radix to perform multiplication, division, and other complex mathematical calculations through the use of logarithms which also may be to any desired base. The storage capacity required for the calculator is small, as only selected logarithmic values (seven in the disclosed embodiment) need be stored. The simplicity of the logic enables the calculator to be a compact device suitable for desk type use and enables accurate calculations to be performed with facility heretofore impossible except with much larger and more complex devices. The logic operated through programmer 90 in response to instructions from the input buttons controls, in addition to logarithmic conversions, addition and subtraction operations (performed by transfers between input register 14 and accumulator register 12 via transfer control units 68), as well as similar transfer to auxiliary storage registers (not shown) in response to input buttons 62. Thus, the calculator is equipped to rapidly perform a wide variety of operations in response to manual input of data and under manual program control. If desired, a sequence of operations, specified by an input tape which controls programmer 90, can be performed on the calculator. Thus, the calculator also has the capacity to perform complex mathematical computations. It will be obvious that the base of the logarithms stored in memory 92 may be any suitable value and that computations may be performed in radixes other than decimal.

While a preferred embodiment of the invention has been shown and described, various modifications thereof will be apparent to those having ordinary skill in the art, and therefore it is not intended that the invention be limited to the described embodiment or to details thereof and departures may be made therefrom within the spirit and scope of the invention as defined in the claims.

What is claimed is:

1. Apparatus for performing a logarithmic conversion comprising storage means for storing logarithmic values of a selected group of constants in the form $1 \pm 1/R^A$ where R is the radix and A is an integer, means for modifying a first number of radix R to provide a product of said first number and one of said constants by adding said first number and a shifted value, programmer means for controlling said modifying means to act on the results of each modified number produced by said modifying means including means responsive to the modified numbers for causing said programmer means to change the value of the constant used by said modifying means, and means responsive to said programmer means for accumulating a logarithmic value by transferring to adder means signals representative of the value of the logarithm of each constant utilized by said modifying means.

2. The apparatus as claimed in claim 1 and further including means for doubling the signals transferred from said storage means to said logarithmic accumulation means to accumulate a logarithmic value equal to the logarithm of the square of said first number.

3. The apparatus as claimed in claim 1 and further including radix point control means including means to shift said first number and to correspondingly transfer signals representative of logarithmic values of a predetermined constant from said storage means to said logarithmic accumulation means in an accumulation operation until predetermined orders of said first number contain predetermined values.

4. Apparatus for performing logarithmic conversions comprising first modifying means for modifying a first number of radix R by adding said first number and a shifted value thereof to provide a product of said first number and one of a selected group of constants in the form $1 \pm 1/R^A$ where R is the radix and A is an integer, second modifying means for modifying a logarithmic value by accumulating signals representative of the value of the logarithm of each constant utilized by said first modifying means, and programmer means for controlling said first and second modifying means to act on each result produced by said modifying means including means responsive to said results for causing said programmer means to change the value of the constant used by said modifying means.

5. The apparatus as claimed in claim 4 and further including radix point control means including means coupled to said first modifying means to shift said first number, and means coupled to said second modifying means to accumulate signals representative of logarithmic values of a predetermined constant until predetermined orders of the number in said first modifying means contain predetermined values.

6. The apparatus as claimed in claim 4 and further including means for modifying the signals accumulated by said second modifying means to accumulate a logarithmic value equal to the logarithm of a power of said first number.

7. A calculator comprising two storage registers, storage means for storing logarithmic values of a group of selected constants, programmer means for successively multiplying the contents of one of said storage registers by selected ones of said constants and modifying the contents of a second storage register by the logarithm of the selected constant in a corresponding operation, and means responsive to the contents of one of said registers for controlling said programmer means.

8. A calculator comprising two storage registers, storage means for storing logarithmic values of a selected group of constants in the form $1 \pm 1/R^A$ where R is the radix and A is an integer, input control for entering signals representative of a first number of radix R in one of said storage registers, first modifying means coupled to said one storage register for modifying said first number by adding said first number and a shifted value thereof to provide a product of said first number and one of said constants, second modifying means coupled to the other storage register for modifying a logarithmic value by accumulating signals transferred from said storage means representative of the value of the logarithm of each constant utilized by said first modifying means, and programmer means for controlling said first and second modifying means to act on each result produced by said modifying means including means responsive to said results causing said programmer means to change the value of the constant used by said modifying means.

9. The calculator as claimed in claim 8 wherein said programmer means controls said modifying means to utilize a series of constants, the constants of said series differing from one another only in the value of A and A in said series of constants being a series of successive integers.

10. The calculator as claimed in claim 8 and further including radix point control means including means coupled to said first modifying means to shift said first number, and means coupled to said second modifying means to accumulate signals representative of logarithmic values of a predetermined constant until predetermined constant until predetermined orders of the number in said first modifying means contain predetermined values.

11. The calculator as claimed in claim 8 and further including means for modifying the signals accumulated by said second modifying means to accumulate a logarithmic value equal to the logarithm of a power of said first number.

12. Apparatus for performing a logarithmic conversion comprising first and second registers, an adder coupled to each register, storage means for storing logarithmic values of a selected group of constants in the form $1 \pm 1/R^A$ where R is the radix and A is an integer, input means for entering signals representative of a number in said radix R in said first register, means for modifying the contents of said first register to provide a product of the contents of said first register and one of said constants by adding the contents of said first register and a shifted value of its contents together, programmer means for controlling the successive modification of the contents of said first register including means responsive to the contents of said first register for causing said programmer means to change the value of the constant used in modifying the contents of said first register, and means responsive to said programmer means for correspondingly modifying the contents of said second register by transferring signals representative of the value of the logarithm of each constant utilized to modify the contents of said first register from said storage means to said second register through the adder coupled thereto to generate a logarithm of said number entered in said first register.

13. Calculating apparatus for performing mathematical operations comprising an input register, an accumulator register, a log register, adder circuitry coupled to each said register for controlling the modification of the contents of the coupled register, storage means for storing logarithmic values of a selected group of constants in the form $1 \pm 1/R^A$ where R is the radix and A is an integer, input control means for entering signals representative of a first number of radix R in said input register, programmer means for controlling the adder circuitry coupled to said input register to modify said first number by adding said first number and a shifted value thereof to provide a product of said first number and one of said constants, for controlling the adder circuitry coupled to said accumulator register to add a number transferred from one of the other registers to the contents of said accumulator register, and for controlling the adder circuitry coupled to said log register to accumulate signals transferred from said storage means representative of the value of the logarithm of each constant utilized in the modfication of said first number in said input register to control a logarithmic conversion, and means responsive to said programmer means for controlling the transfer of signals representative of numbers between said input register, said accumulator register, and said log register.

14. The calculator as claimed in claim 13 wherein said programmer means controls said adder circuitry to utilize a series of constants, the constants of said series differing from one another only in the value of A and A in said series of constants being a series of successive integers.

15. The apparatus as claimed in claim 14 and further including radix point control means including means coupled to said input register to shift said first number, and means to accumulate in said log register signals representative of logarithmic values of a predetermined constant until predetermined orders of the number in said input register contain predetermined values.

16. The apparatus as claimed in claim 15 and further including means for modifying the signals accumulated by said log register to accumulate a logarithmic value equal to the logarithm of a power of said first number.

17. A calculator comprising input means having a plurality of control elements including ten manual control keys representing numerical values from 0 through 9, input register means for accumulating a numerical value entered by said control elements, logarithmic means for generating the logarithmic value of the numerical value in said input register means, a single manual control button for initiating operation of said logarithmic means, and output means for displaying the logarithmic value generated by said logarithmic means in multidigit decimal form.

18. A calculator comprising input means having a plurality of control elements including ten manual control buttons representing numerical values from 0 through 9, input register means for accumulating a numerical value entered by said control elements, logarithmic means including first modifying means for modifying a first number of radix R stored in said input register means by selectively adding or subtracting a shifted value thereof to provide a product result N where N is a product of said first number and one of a selected group of constants, second modifying means for providing a logarithmic result by accumulating signals representative of the value of the logarithm of each constant utilized in said first modifying means, and programmer means for controlling said first and second modifying means including means responsive to said results for causing said programmer means to change the value of the constant used by said modifying means, a single manual control button for initiating the operation of said logarithmic means, and output means for displaying the logarithmic value generated by said logarithmic means in multidigit decimal form.

19. The calculator as claimed in claim 18 wherein said first modifying means includes a first register and adder circuitry coupled thereto and said second modifying means includes a second register and adder circuitry coupled thereto, and means responsive to an output from one of said registers as a function of the numerical values stored therein for controlling said programmer means.

20. The calculator as claimed in claim 18 and further including storage means for the logarithmic values of said selected group of constants and means responsive to said programmer means for applying signals representative of the logarithmic values of selected constants to said second modifying means from said storage means.

21. The calculator as claimed in claim 18 and further including means responsive to a manual control button for modifying the signals applied to said second modifying means for accumulating a logarithmic value equal to the logarithm of a power of the number stored in said first modifying means.

22. The calculator as claimed in claim 18 wherein said programmer means is a sequencing device and includes a first output for selecting one of said constants, a second output for transferring a logarithmic value of said selected constant to said second modifying means, and for concurrently actuating said first modifying means to modify the number stored in said first modifying means by a shifted value of that number corresponding to said selected constant, and means responsive to an output from said first modifying means indicative of a predetermined change in the number stored in said first modifying means for actuating said programmer means to select a different one of said constants.

23. The calculator as claimed in claim 22 and further including means responsive to an output from said second modifying means indicative of a predetermined change in the number stored in said second modifying means for actuating said programmer means to select a different one of said constants.

24. The calculator as claimed in claim 23 wherein said constants are in the form $1 \pm 1/R^A$ where R is the radix and A is an integer.

References Cited

UNITED STATES PATENTS

| | | | |
|---|---|---|---|
| 3,099,742 | 7/1963 | Byrne | 235—150 |
| 3,141,963 | 7/1964 | Zuhlsdorf | 235—164 |

MALCOLM A. MORRISON, *Primary Examiner.*

V. SIBER, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,402,285 September 17, 1968

An Wang

It is certified that error appears in the above identified patent and that said Letters Patent are hereby corrected as shown below:

Column 6, in the table, third column, line 10 thereof, ".675970" should read -- .675979 --; same table, third column, line 13 thereof, "696460" should read -- .696460 --. Column 8, lines 28 and 29, cancel "until predetermined constant --.

Signed and sealed this 10th day of February 1970.

(SEAL)
Attest:

Edward M. Fletcher, Jr.
Attesting Officer

WILLIAM E. SCHUYLER, JR.
Commissioner of Patents